INVENTORS
CHARLES R. RONAN
EARL S. STEVENS

United States Patent Office 3,817,810
Patented June 18, 1974

3,817,810
METHOD OF FORMING CORE PANELS
Charles R. Ronan, Santa Ana, and Earl S. Stevens, Riverside, Calif., assignors to Rohr Industries, Inc.
Continuation of application Ser. No. 15,349, Mar. 2, 1970, which is a continuation-in-part of application Ser. No. 861,734, Sept. 29, 1969, both now abandoned. This application May 1, 1972, Ser. No. 251,532
Int. Cl. B31d 3/02
U.S. Cl. 156—297                    1 Claim

ABSTRACT OF THE DISCLOSURE

A bar of solid adhesive is applied to a hot roller to thereby melt said adhesive and coat it on an applicator roller. Faying edges of honeycomb core material are contacted with adhesive coated applicator roller to transfer adhesive to said edges, which are then held against a facing sheet while adhesive is cured to thereby bond the core and sheet together. Applicator roller can also be used to coat a perforated facing sheet, without clogging the holes in the sheet when proper conditions are maintained, and the adhesive thus applied to said sheet can be cured while faying edges of honeycomb core material are held thereagainst.

This is a continuation of U.S. Patent Application Ser. No. 15,349 filed on Mar. 2, 1970 which case was a continuation in part of U.S. Patent Application Ser. No. 861,734 filed on Sept. 29, 1969, both now abandoned.

SUMMARY OF THE INVENTION

The herein disclosed invention relates to panels and more particularly to an improved method of fabricating panels of the type having cores to which facing sheets are bonded along lines or at points, such cores being respectively commonly identified as the honeycomb and diamond types.

In the manufacture of lightweight panels of the type used in aircraft it is a common practice to bond a facing sheet to the faying edges of a honeycomb core by means of a sheet of brazing alloy or polymeric material which is placed between the facing sheet and the core and then heated to its melting temperature and thereafter solidified, thereby bonding the facing sheet to the core. The use of such sheet bonding material adds unnecessary weight to a panel of the aforesaid type since the adhesive covers the entire inner surface of a facing sheet rather than only the limited areas between said facing sheet and the faying edges of a core. Furthermore, sheets of bonding material cannot be used to bond together components of the type of sound absorbing panels which comprise perforated facing sheets bonded to honeycomb cores, because the adhesive clogs the perforations of the facing sheets and thus makes the panels ineffective for their intended function.

In one panel fabrication procedure in accordance with the present invention, melted adhesive is applied to a rotating roller (referred to hereinafter as the coating or applicator roller) as the latter is moved across one side of a core of a sandwich type panel or as the core is moved across the roller, thereby transferring a portion of the adhesive to the faying edges of the core. Thereafter a facing sheet is pressed against the adhesive-coated core while the adhesive is being cured to bond the sheet and core together. Preferably the core is held against the coating roller by a nip roller, and a doctor roller is employed to control the thickness of the layer of melted adhesive which is applied to the coating roller. In another procedure in accordance with the invention, the aforesaid roller is used to apply adhesive to a perforated face sheet, under such process conditions that the holes of said sheet are not clogged with the adhesive. The faying edges of a honeycomb core are then pressed against the coated side of the perforated facing sheet as the adhesive is cured, producing a structure which can be used as a sound-suppressing material in turbojet engines and the like.

DETAILED DESCRIPTION

Figure 1:
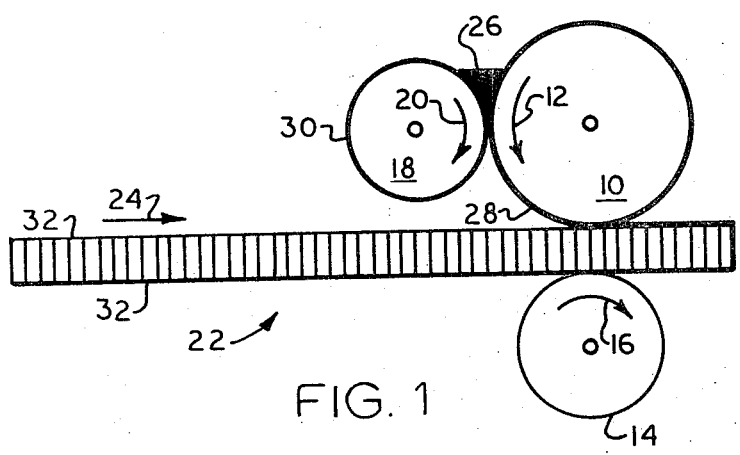
FIG. 1 is a schematic representation of a preferred mode of performing a first step in the fabrication of honeycomb core panels in accordance with this invention.

In FIG. 1 the number 10 designates an applicator or coating roller which is mounted for rotation about a fixed horizontal axis and which is connected to conventional drive means (not shown) adapted to turn the roller in the direction indicated by arrow 12 when the illustrated apparatus is operated. Disposed in spaced, parallel relation under coating roller 10 is a nip roller 14 which preferably is interconnected with the aforementioned drive means so that it rotated in the direction indicated by arrow 16 as the coating roller is rotated. A doctor roller 18 is mounted in spaced, parallel relation beside coating roller 10 and is rotated by the drive means in the direction indicated by arrow 20.

The nip and doctor rollers are preferably arranged so that they can be spaced at different distances from coating roller 10. Thus the gap between coating roller 10 and nip roller 14 can be adjusted so that the faying edges at one end of a honeycomb core, generally designated by the number 22 and having any selected thickness, can be engaged with these rollers, whereupon the core is pulled in the direction indicated by arrow 24 as a result of the counterclockwise rotation of the coating roller and the clockwise rotation of the nip roller (as the rollers are viewed in FIG. 1). To avoid crushing of cell walls in cores which do not have a uniform thickness, the peripheral portions of the coating roller and the nip roller are formed of a suitable resilient material.

Doctor roller 18 is heated by conventional means (not shown), such as steam supply pipes, hot oil, or electric heating coils. Consequently a selected bonding material in solid form can be placed at the pinch point of the coating and doctor rollers (i.e., at the point occupied by the body of adhesive 26 in FIG. 1), and this bonding material is then melted by the heat which it absorbs from the doctor roller. End plates (not shown) are provided to keep the melted adhesive from flowing off the ends of the coating roller and the doctor roller. It will be obvious that the thickness of the adhesive layers 28, 30 which are respectively coated on the coating roller and the doctor roller after the solid adhesive is melted depends upon the size of the gap between said rollers. Since doctor roller 18 is mounted for movement toward or away from coating roller 10, the thickness of the adhesive layer 28 on the coating roller can be selected.

Figure 2:
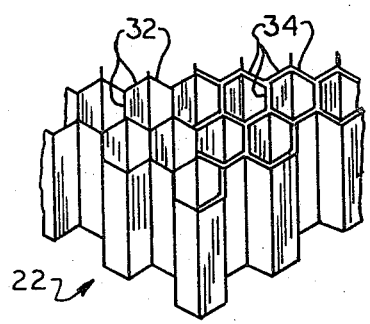
FIG. 2 is a pictorial representation of a section of honeycomb core the edges of one side of which are partially coated with adhesive by the method of the invention.

When a honeycomb core 22 is passed between coating roller 10 and nip roller 14 a portion of adhesive layer 28 on said coating roller is transferred to the faying edges 32 of the core, as illustrated in FIG. 2 wherein the beads of transferred adhesive are designated by the number 34. It has been found that the described procedure applies adhesive to the faying edges of a core in continuous beads which are much more uniform in thickness and width than the beads placed on faying edges of the same type of core by the partial immersion of the core in melted adhesive. Furthermore, the roller coating method of this invention does not close cell openings of a core with a film of adhesive, such as occurs when a sheet of adhesive is employed to bond a core to facing sheets.

Figure 3:
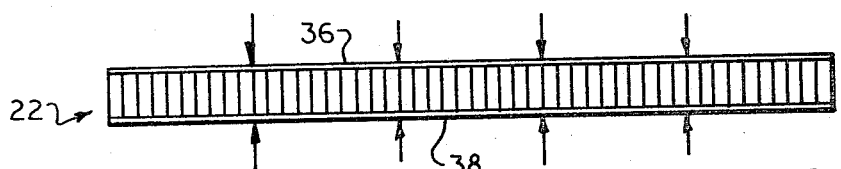
FIG. 3 is a schematic representation of a second process step in the fabrication of a honeycomb core panel in accordance with the invention.

After the faying edges on one side of a honeycomb core are coated with melted adhesive as described hereinbefore, a facing sheet 36 (see FIG. 3) is placed against these coated edges and a caul sheet 38 is preferably placed against the other side of said core. As illustrated by arrows in FIG. 3, pressure is then applied to the facing sheet and the caul sheet by conventional means such as a vacuum bag (not shown), and the assembly is heated to permit the thermosetting adhesive on the faying edges of the core to solidify and thereby bond the core and the facing sheet together. The faying edges of the uncovered side of the core can thereafter be bonded to a second facing sheet by repeating the described process steps.

The afore-described method of the invention is further illustrated by the following specific example. Apparatus of the type illustrated in FIG. 1 was provided with a coating roller 10 the outer portion of which was formed of rubber, a nip roller 14 the outer portion of which was also formed of rubber, and a doctor roller 18 formed of chromium plated steel. The nip roller was adjusted so that there was a .760 inch gap between it and the coating roller, and the doctor roller was adjusted so that there was an .042 to .046 inch gap between it and said coating roller. The temperature of the doctor roller was maintained at approximately 190° F., and a billet of modified epoxy adhesive was placed at the pinch point of the coating and doctor rollers and allowed to melt. With the coating, nip, and doctor rollers rotating at such angular velocity that their surface velocities were approximately 10 feet per minute, a honeycomb core having a thickness of 0.750 inch was fed between the coating and nip rollers. The core was formed of 5053 T3 Aluminum and its cells were hexagonal in shape with a wall thickness of .0015 inch and a wall width of ⅜ inch. It was found that .055 pound of adhesive was placed on each square foot of side area of the core, and the beads of this adhesive were uniformly applied to the faying edges of the core in the manner illustrated in FIG. 2. The core and facing sheets were placed in a vacuum bag to thereby exert a pressure substantially equal to atmospheric pressure on the facing sheets. The enveloped panel components were final cured at 350° F. and then cooled to ambient temperature. The bond which was thus formed between the core and the facing sheet placed against the coated side of the core was found to have the same strength as a bond formed between the same type of core and a facing sheet by the use of adhesive in sheet form.

Figure 5:
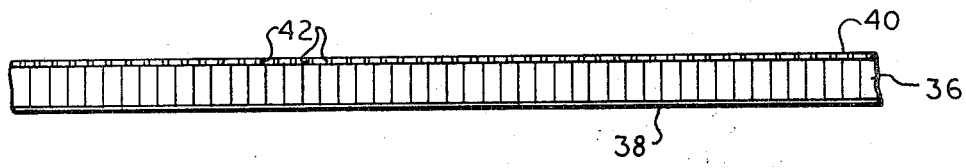
FIG. 5 is a pictorial representation of a section of the aforesaid sound suppression panel after its components have been bonded together.

The roller coating apparatus which has been described has also been used successfully for applying adhesive to perforated facing sheets of the sandwich type panels which are installed in the intake and exhaust passages of turbojet engines to absorb sound energy. As illustrated in FIG. 5, such panels may comprise a core 36 of honeycomb material sandwiched between, and bonded at the edges of its cells to, an imperforate sheet 38 which is attached to support structure of an aircraft engine housing and a sheet 40 having a plurality of small perforations 42 spaced apart thereon, the cells of said core serving as resonating chambers in which sound energy which passes through said perforations is absorbed. Sheet 38 may be bonded to the faying edges of one side of core 36 by conventional techniques, such as by placing a sheet of adhesive between said sheet and said core and pressing the latter together while the adhesive is heated and then cooled. However, it is of course necessary to keep the perforations 42 in the outer sheet 40 open when it is bonded to the faying edges on the other side of the core. Surprisingly, it has been found that the apparatus which has been described hereinbefore can be used to apply melted adhesive to a side of a perforated sheet 40 without closing the holes therein, provided the proper procedure is followed. Thereafter the coated side of the perforated sheet is pressed against the faying edges of a honeycomb core 36 while the assembly is heated to cure the adhesive on said sheet and thereby bond the components together.

Figure 4:
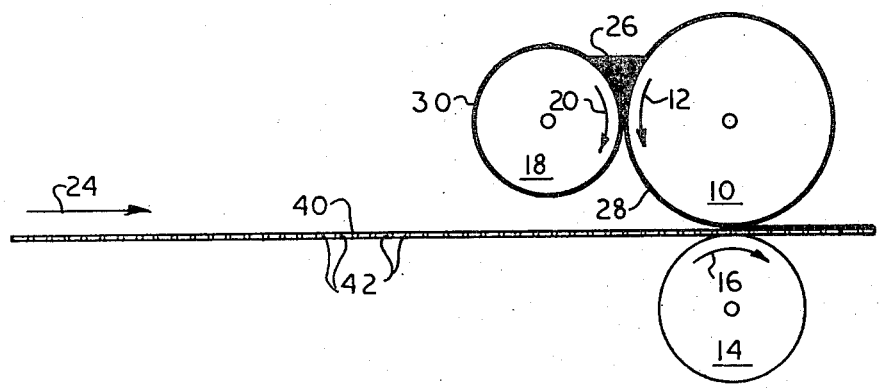
FIG. 4 is a schematic representation of the first step in the process of forming a sound suppression panel in accordance with the invention.

As illustrated in FIG. 4, to apply adhesive to one side of a perforated facing sheet the rollers 10, 14, and 18 of the afore-described apparatus are operated in the same manner as when adhesive is applied to the faying edges of a honeycomb core, with the spacing between the applicator roller 10 and the nip roller being set to accommodate the thickness of the particular facing sheet, the spacing between the doctor roller 18 and the applicator roller being set to apply to the latter a coating of adhesive which will not clog the holes of the facing sheet when a portion of said adhesive is transferred to said sheet, and the surface velocities of rollers 10, 14 and 18 also being set to prevent clogging of said holes. Various other factors in the operation of the roller coating apparatus may require different adjustments for different adhesives; for example, the temperature at which the doctor roller 18 is maintained affects the viscosity of the adhesive and thus its ability to be applied to the coating roller 10 in a layer sufficiently thin to prevent clogging of the perforations in the facing sheet. As an illustrative example of the application of adhesive to one side of a perforated face sheet, the following information is presented.

Doctor roller 18 was adjusted so that there was a gap of about .025 inch between it and coating roller 10, and a gap of 0.041 inch was provided between the latter and nip roller 14 to allow passage of a .031 inch thick perforated sheet of aluminum alloy therebetween. More particularly, the aforesaid sheet contained holes having a diameter of .060 inch and spaced apart a distance of .012 inch center-to-center, although the disclosed process is not limited to the application of adhesive to a sheet having holes of this diameter and spacing. Epoxy adhesive was heated to 170° F. in the reservoir between the heated doctor roller and the applicator roller, the surface velocities of the rollers 10, 14 and 18 were adjusted to 30 feet per minute, and the perforated sheets were fed between the coating roller and the nip roller, thereby transferring adhesive from said coating roller to one side of the sheets in a uniform layer which when cured was found to be .010 inch thick and thus sufficient to provide a strong bond between the coated side of a sheet and the edges of one side of a honeycomb core in a panel such as that illustrated in FIG. 5. However, the holes in the coated sheets were 99% free of adhesive.

It will be obvious that the invention is not limited to the use of a particular adhesive or to the specific operating conditions described in the foregoing examples, which have been presented only for the purpose of illustration. Hence the scope of the invention should be considered to be limited only by the terms of the claim appended hereto.

What is claimed as new and useful and desired to be secured by U.S. Letters Patent is:

1. A method of forming an acoustic panel consisting of a rigid thin walled honeycomb core bonded on one side to an imperforate sheet and on the other side to a perforate facing sheet to form resonant chambers comprising
 (a) transferring a hot melt roller coating of an epoxy adhesive onto one face of the perforate facing sheet in a sufficiently thin layer of predetermined thickness to prevent clogging of the small openings of the facing sheet by
  (1) rotating a doctor roller a predetermined distance from the coating roller to form a gap therebetween substantially equal to the thickness of the melted coating of adhesive;

(2) positioning the adhesive in bar form in the gap;

(3) heating one of the coating and doctor rollers to a predetermined temperature sufficiently high to melt the adhesive and apply it to the coating roller in the thin coating of such viscosity to provide the thin layer of adhesive; and (4) rotating a nip roller a predetermined distance from the coating roller to pull the facing sheet therebetween and apply the thin layer of adhesive thereto from the coating of melted adhesive, the spacing between the doctor roller and the applicator roller being set to apply to the latter a coating of adhesive which will not clog the holes of the facing sheet when a portion of said adhesive is transferred to said sheet and the surface velocities of said rollers being set to prevent the clogging of said holes;

(b) holding the coated face of the facing sheet against the thin edges of the core cells on one face of the core while the transferred adhesive is cured to bond the core and facing sheet together.

References Cited

UNITED STATES PATENTS

| | | | |
|---|---|---|---|
| 3,108,367 | 10/1963 | Christman | 29—455 LM X |
| 3,373,480 | 3/1968 | Fuchs, Jr. | 29—471.1 X |
| 2,912,398 | 11/1959 | Johnson et al. | 156—330 X |
| 2,719,809 | 10/1955 | Herts | 156—196 |
| 2,722,735 | 11/1955 | Beamish | 29—471.7 |
| 2,828,235 | 3/1958 | Holland et al. | 156—197 X |
| 3,067,507 | 12/1962 | Titus | 156—382 X |
| 3,166,149 | 1/1965 | Hulse et al. | 181—33 |
| 3,444,568 | 5/1969 | Vogelsang | 9—6 |

GEORGE F. LESMES, Primary Examiner

H. F. EPSTEIN, Assistant Examiner

U.S. Cl. X.R.

117—111 R; 156—330; 161—68, 184